ып
United States Patent
Biton et al.

(10) Patent No.: US 8,408,701 B2
(45) Date of Patent: *Apr. 2, 2013

(54) METHOD FOR GENERATING A TRIMMING SETPOINT FOR AN OPHTALMIC LENS

(75) Inventors: Jérémie Biton, Charenton le Pont (FR); Frédéric Dubois, Charenton le Pont (FR); David Freson, Charenton le Pont (FR); Eric Belloni, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 240 days.

This patent is subject to a terminal disclaimer.

(21) Appl. No.: 12/876,273

(22) Filed: Sep. 7, 2010

(65) Prior Publication Data

US 2011/0149234 A1  Jun. 23, 2011

(30) Foreign Application Priority Data

Sep. 14, 2009 (FR) ...................................... 09 04384

(51) Int. Cl.
*G02C 13/00* (2006.01)
(52) U.S. Cl. .................................. 351/178; 351/159.73
(58) Field of Classification Search .............. 351/159.73–159.76, 178; 264/1.1, 264/1.32
See application file for complete search history.

(56) References Cited

U.S. PATENT DOCUMENTS

2008/0248720 A1* 10/2008 Shibata .............................. 451/5

FOREIGN PATENT DOCUMENTS

| EP | 0750172 A2 | 12/1996 |
|---|---|---|
| EP | 1591199 A2 | 11/2005 |
| EP | 1642678 A1 | 4/2006 |
| EP | 2028532 A1 | 2/2009 |

OTHER PUBLICATIONS

French International Search Report, dated Mar. 1, 2010, from corresponding French Application.

* cited by examiner

*Primary Examiner* — James Greece
(74) *Attorney, Agent, or Firm* — Young & Thompson (57) ABSTRACT

A method for generating a trimming setpoint for an ophthalmic lens to be fitted in a surround of a spectacle frame, includes:

a) within a coordinate system of the surround identified by a horizontal axis, acquiring the shape of a longitudinal profile of the surround and the perimeter length of this longitudinal profile;

b) within an optical coordinate system of the ophthalmic lens which is identified by a centering point and by a horizontal axis and which is made to coincide with the coordinate system of the surround, centering and orienting the longitudinal profile, c) projecting the acquired longitudinal profile onto a curved surface deduced from a curvature parameter of the ophthalmic lens or from the spectacle frame, d) correcting in two operations, the shape of the projected longitudinal profile, so as to equalize its perimeter length with the perimeter length of the acquired longitudinal profile, and e) deducing from the corrected longitudinal profile the trimming setpoint.

17 Claims, 5 Drawing Sheets

METHOD FOR GENERATING A TRIMMING SETPOINT FOR AN OPHTALMIC LENS

TECHNICAL FIELD OF THE INVENTION

The present invention relates generally to the preparation of ophthalmic lenses for them to be fitted in full-rim or half-rim spectacle frame surrounds.

TECHNOLOGICAL BACKGROUND

The technical part of the optician's profession involves mounting a pair of ophthalmic lenses on a spectacle frame selected by a wearer.

This mounting is divided up into three main operations:
acquisition of the contours of the surrounds of the selected spectacle frame,
centering of each lens, which consists in appropriately positioning and orienting the acquired contours relative to the ophthalmic lenses so that, once assembled on the spectacle frame, each lens is suitably centered on the pupil of the corresponding eye of the wearer, then
machining of each lens, which consists in cutting them along these contours.

In the context of the present invention, interest is more particularly focused on the spectacle frames with surrounds, that is to say on full-rim and half-rim ("arched") spectacle frames.

For these frames, the optician's physical objective is to cut the ophthalmic lenses so that they can be mechanically and esthetically adapted to the shapes of the surrounds, while ensuring that these lenses best fulfill the optical functions for which they were designed.

The machining operation comprises in particular, in the case of full-rim frames, a beveling step used to form on the edge of the lens a fitting rib, commonly called bevel, capable of being fitted into a groove which runs along the internal face of the corresponding surround of the frame.

On the other hand, in the case of half-rim frames, the machining operation includes a grooving step with which to form a fitting groove on the edge of the lens. When mounting the lens in the surround, this fitting groove is engaged on a rib that runs along the internal face of the corresponding half-rim (or "arch") of the frame. The ophthalmic lens is then held bearing against this arch with the help of a thread, generally made of nylon (possibly of metal), which is engaged in the fitting groove and the ends of which are connected to the ends of the arch.

Whatever the type of spectacle frame selected, the acquisition and machining operations must be carried out with care so that the lens can be fitted perfectly into its surround, without force and "at the first attempt", that is to say without requiring any remachining or any bending of the nylon thread.

To acquire the shape of the surround, a contour reading appliance is generally used that comprises a feeler which slides directly over the surround or over a presentation lens characteristic of the shape of this surround.

However, at the end of this feeling operation, reading errors inherent to the operation of the reading appliance are observed. At the end of the machining operation, machining errors that are also inherent to the operation of the trimming appliance are also observed.

By reducing these errors, the applicant has observed that some ophthalmic lenses remain difficult to mount in their surrounds. It is then necessary, to dispel any risk of the lens slipping out of its surround, to remachine the lens and/or to modify the length of the nylon thread, which is tedious to do.

OBJECT OF THE INVENTION

In order to remedy this drawback, the present invention proposes a method for generating a trimming setpoint for an ophthalmic lens, that makes it possible to prevent any difficulties in mounting the ophthalmic lenses in their surrounds.

More particularly, there is proposed, according to the invention, a method for generating a trimming setpoint for an ophthalmic lens for it to be fitted in a surround of a spectacle frame, comprising steps consisting in:

a) within a coordinate system of the surround identified by a horizontal axis, acquiring the shape of a longitudinal profile of said surround and the perimeter length of this longitudinal profile;

b) within an optical coordinate system of the ophthalmic lens which is identified by a centering point and by a horizontal axis and which is made to coincide with the coordinate system of the surround, centering and orienting said longitudinal profile, c) projecting said acquired longitudinal profile onto a curved surface deduced from a curvature parameter of said ophthalmic lens or from a curvature parameter of said spectacle frame, d) correcting the shape of said projected longitudinal profile, so as to equalize its perimeter length with the perimeter length of the acquired longitudinal profile, e) deducing from said corrected longitudinal profile said trimming setpoint.

More particularly according to the invention, in step d), the correction is made in two operations consisting in:
stretching, according to a given mathematical function, the projected longitudinal profile along an ordinate axis transversal to said horizontal axes, and in
compressing the stretched longitudinal profile along an axis orthogonal to said ordinate axis.

The term "transversal" should be understood to mean that the ordinate axis is oblique or perpendicular relative to the horizontal axis.

The applicant has observed that some of the mounting difficulties stemmed from the shape of the surrounds of the selected spectacle frames. The applicant has observed in particular that the spectacle frames that are greatly curved (or "arched") and elongate often provoke such difficulties.

These difficulties are explained as follows.

On full-rim and half-rim spectacle frames, the more elongate the surround, the greater the pressure on the nasal and temporal portions of the surround. This great pressure explains the difficulty in mounting.

Moreover, the greater the pressure on the nasal and temporal portions of the surround, the smaller it is on the bottom and top portions of the surround. This reduced pressure explains the risks of the lens slipping out of the surround.

On full-rim spectacle frames, this pressure difference generates even greater difficulties. A spectacle frame rim is in fact usually twisted, so that the transversal sections of the rim have variable inclinations, maximum on the side of its temporal and nasal areas. The bevel of the lens however has a uniform inclination along the contour of the lens. The difference in inclination between the bevel of the lens and the groove of the rim in the nasal and temporal areas then generates an instability when mounting the lens in the rim, which adds to the above-mentioned excess pressure problem, which increases the risks of the bevel slipping out of the groove.

By virtue of the invention, the lens is machined according to a longitudinal profile stretched along the ordinate axis (which is preferably vertical in the conditions in which the frame is worn by the wearer), which makes it possible to increase the pressure of the lens on the top and bottom areas of the surround.

This longitudinal profile is, moreover, compressed along an axis orthogonal to the ordinate axis (in practice, the horizontal axis) in order to equalize the circumference of the lens with that of the surround, which makes it possible to reduce the pressure of the lens on the nasal and temporal areas of the surround.

In this way, the method according to the invention ensures a mounting "at the first attempt", which makes it possible to avoid any remachining or any need to bend the nylon thread.

In step c), the aim is to project the longitudinal profile onto a surface approximating the shape of one of the faces of the ophthalmic lens so as to acquire the three-dimensional coordinates of a longitudinal profile extending over the lens. Because of this projection, the projected profile has a peripheral length that is different from that of the acquired profile. In step d), the issue is then to correct this projected profile while ensuring that the corrected profile has a peripheral length identical to that of the acquired profile (that is to say, equal to that of the surround).

In a main embodiment of the invention, steps a) to e) are successively performed one after the other, and the curved surface onto which the acquired longitudinal profile is projected is deduced from a curvature parameter of the ophthalmic lens.

In other words, steps c) and d) are performed after the centering of the ophthalmic lens by a centering-securing device. These steps can then be implemented either by this centering-securing device, or by a machining device suitable for trimming the ophthalmic lens. Consequently, when these steps are implemented, the geometry of the ophthalmic lens is already known, so that, in step c), it is possible to project the acquired longitudinal profile onto a surface deduced from the shape of the ophthalmic lens.

In another embodiment, steps c) and d) are performed before step b), and the curved surface onto which the acquired longitudinal profile is projected is deduced from a curvature parameter of the spectacle frame.

In other words, steps c) and d) are performed even before the lens has been centered. They are therefore preferably implemented by the device that was used to acquire the longitudinal profile of the surround of the spectacle frame. Consequently, when these steps c) and d) are implemented, the geometry of the ophthalmic lens is not yet known, so that, in step c), it is only possible to project the acquired longitudinal profile onto a surface that is considered to approximate the shape of one of the faces of the ophthalmic lens. This approximating surface is then calculated according to the only shape known at this stage, which is the shape of the spectacle frame.

The curvature parameter of the spectacle frame used to characterize this approximating surface can then span two realities.

This parameter may be a curvature parameter of the surround of the spectacle frame intended to accommodate the ophthalmic lens that is to be trimmed. The lens curvatures are in fact generally chosen according to the curvatures of the spectacle frame surrounds intended to accommodate them, so as to ensure that the lenses can be fitted into their surrounds. The curvature of the surround thus makes it possible to obtain an approximation of the curvature of the ophthalmic lens to be trimmed.

This parameter can also be an overall curvature parameter of the spectacle frame, such as the angle of inclination between the median planes of the two surrounds. In practice, as is known, this angle of inclination is generally linked to the curvature of a surround. This angle of inclination can thus be used to obtain an approximation of the curvature of the ophthalmic lens that is to be trimmed.

Preferably, in step d), the two operations for correcting the shape of the projected longitudinal profile are performed simultaneously.

As a variant, they can be performed successively one after the other.

In this variant, the longitudinal profile is first of all stretched along a preferred axis (the ordinate axis), then compressed along a second axis, orthogonal to the preferred axis. In the compression operation, the longitudinal profile can also be compressed along the preferred axis, provided, however, that the compressed longitudinal profile remains more elongate than the projected longitudinal profile along the preferred axis.

It is also possible for provision to be made to begin by compressing the projected longitudinal profile along the second axis, before stretching it along the preferred axis.

Other advantageous and nonlimiting features of the invention are as follows:
- said optical coordinate system also being identified by an axis, called normal axis, which is perpendicular to the tangential plane of the ophthalmic lens at the centering point, said ordinate axis is orthogonal to said horizontal and normal axes;
- said mathematical function is independent of the difference between said perimeter lengths;
- the mathematical function is an expansion about the horizontal axis, of a ratio known as the stretching coefficient;
- the mathematical function has a predetermined stretching coefficient;
- the mathematical function has a stretching coefficient that is determined according to the shape of the ophthalmic lens and/or the shape of the spectacle frame and/or the material of the spectacle frame;
- the mathematical function has a stretching coefficient that is variable according to the position, along the horizontal axis, of the point concerned on the projected longitudinal profile;
- the stretching coefficient is determined according to a curve characteristic of the surround;
- if said curve characteristic is below a determined threshold, the stretching coefficient is equal to 1 at any point of the projected longitudinal profile and said mathematical function is the identity function, otherwise, the stretching coefficient is strictly greater than 1 in at least a portion of the projected longitudinal profile;
- said curved surface is the front or rear face of the ophthalmic lens;
- said curved surface is a surface situated between the front and rear faces of the ophthalmic lens;
- the projection is an orthogonal projection along an axis that is normal to the horizontal axis;
- in step a), the spatial coordinates of a plurality of points characterizing the shape of said longitudinal profile are acquired, and the perimeter length of said longitudinal profile is calculated on the basis of these spatial coordinates.

DETAILED DESCRIPTION OF AN EXEMPLARY EMBODIMENT

The following description, given in light of the appended drawings, and as a nonlimiting example, will clearly show what the invention consists of and how it can be implemented.

Spectacle Frame

Figure 1:
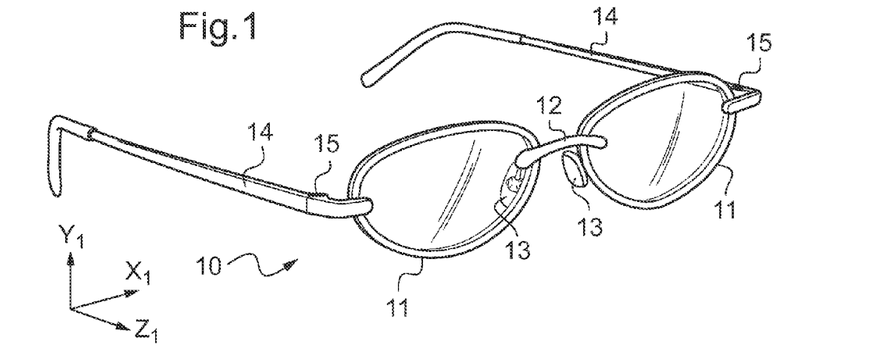
FIG. 1 is a perspective diagrammatic view of a full-rim spectacle frame.
Figure 2:
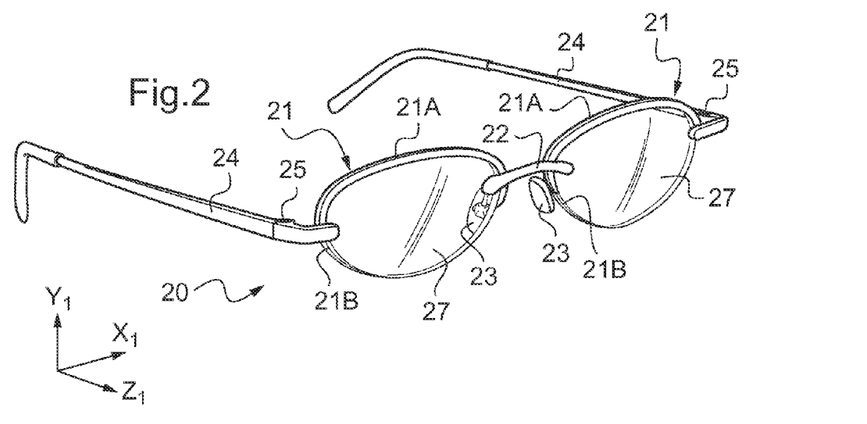
FIG. 2 is a perspective diagrammatic view of a half-rim spectacle frame.

FIGS. 1 and 2 show two spectacle frames 10, 20, respectively full-rim and half-rim, each comprising two surrounds 11, 21.

More particularly, in FIG. 1, the full-rim spectacle frame 10 comprises two rims 11 each intended to accommodate an ophthalmic lens and to be positioned facing one of the two eyes of the wearer when the latter wears said frame.

The two rims 11 are linked to one another by a bridge 12. They are also each equipped with a nose pad 13 that is able to rest on the nose of the wearer and a temple arm 14 that can rest on one of the ears of the wearer. Each temple arm 14 is hinged to the corresponding rim by means of a barrel hinge 15.

The two rims 11 of the spectacle frame 10 have an internal edge in which is provided a fitting groove, commonly called groove, of a generally dihedral-shaped section.

The two rims 11 have a non-zero curve. This curve can be characterized by a mean radius of curvature corresponding to the radius of curvature of a sphere passing through four points of the groove situated equidistantly in pairs.

In FIG. 2, the surrounds 21 of the half-rim spectacle frame 20 each comprise an arc 21A (or "half-rim") and a nylon thread 21B, the two ends of which are connected to the ends of this arc 21A. These arcs 21A and the nylon threads 21B are used together to hold two lenses on the spectacle frame 20.

The two arcs 21A are linked to one another by a bridge 22. Each arc 21A is equipped with a nose pad 23 that is able to rest on the nose of the wearer and a temple arm that is able to rest on one of the ears of the wearer. Each temple arm 24 is articulated on the corresponding arc 21A by means of a barrel hinge 25.

The two arcs 21A of the spectacle frame 20 have an internal edge along which runs a fitting rib.

As shown in FIG. 2, the spectacle frame 20 bears two presentation lenses 27 delivered to the optician with the frame. These two presentation lenses 27 are used as a shape template for trimming the ophthalmic lenses to be mounted on the spectacle frame 20.

The two surrounds 21 have a non-zero curve. This curve can be characterized by the radius of curvature of the spherical front face of the presentation lens 27.

Ophthalmic Lens

Figure 3:
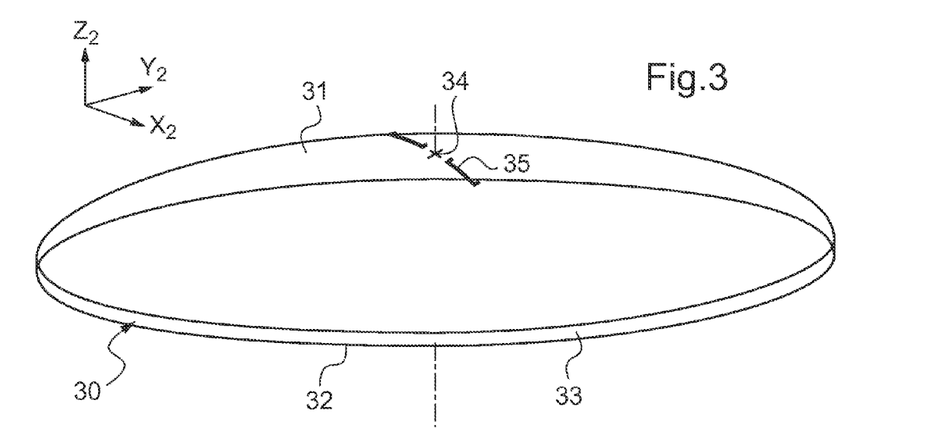
FIG. 3 is a perspective diagrammatic view of an untrimmed ophthalmic lens.

As shown in FIG. 3, the ophthalmic lens 30 has two optical faces, front 31 and rear 32, and an edge 33.

The front optical face 31 is in this case spherical and has a known radius of curvature.

The edge 33 of the lens has an initially circular contour. The lens is, however, intended to be trimmed to the shape of the corresponding surround 11, 21 of the spectacle frame 10, 20, so as to be able to be fitted into the latter.

In the case where the selected frame is full-rim (FIG. 1), the ophthalmic lens 30 is more specifically intended to be trimmed to have on its edge 33 a fitting rib (or bevel) that is able to be fitted into the groove of the corresponding rim 11 of the spectacle frame 10.

In the case where the selected frame is half-rim (FIG. 2), the ophthalmic lens 30 is, on the contrary, intended to be trimmed to have on its edge 33 a fitting groove which is able to be engaged on the fitting rib of the corresponding arc 21A of the spectacle frame and which is able to accommodate the nylon thread 21B.

This ophthalmic lens 30 has optical characteristics that are determined according to the needs of the spectacle wearer. It has in particular spherical, cylindrical and prismatic refringence properties which are specific to the wearer.

This ophthalmic lens 30 is also provided with markings 34, 35 which provide a convenient identification of the optical coordinate system of the ophthalmic lens 30 for its mounting on the spectacle frame 10, 20 selected by the wearer. These markings in this case consist of temporary ink markings 34, 35. They could as a variant consist of permanent markings, such as micro-engravings.

In this case, these markings comprise a centering cross 34 that is used to identify the position of the centering point of the lens, that is to say, in the case of a lens having an exclusively spherical optical power, the point where the incident ray and the transmitted ray have the same axis.

It also comprises, either side of this centering cross 34, two horizon lines 35 identifying the horizontal of the ophthalmic lens 30.

The optical coordinate system of the ophthalmic lens 30 is then characterized by an orthonormal frame of reference comprising a horizontal axis $X_2$ parallel to said horizon lines 35, an ordinate axis $Y_2$, and a normal axis $Z_2$ which is perpendicular to the plane tangential to the front face of the ophthalmic lens 30 at the centering point 34.

Client and Manufacturer Terminals

The invention offers a particular advantage when the preparation of the lenses is entrusted to lens manufacturers other than the opticians, that is to say when the opticians act as "order givers" who subcontract the manufacture and trimming of the lenses to such manufacturers.

To illustrate this configuration, we will consider here, on the one hand, a client terminal installed with an optician for ordering lenses, and, on the other hand, a manufacturer terminal installed with a lens manufacturer for the manufacture and trimming of lenses.

The client terminal comprises a computer unit 150 (FIG. 4), in this case a desktop computer, for storing and transmitting ophthalmic lens order data, for example via an IP-based communication protocol (internet type). These order data comprise prescription data relating to the corrections to be made to the eyes of the wearer and shape data relating to the spectacle frame 10, 20 selected by the wearer.

The manufacturer terminal comprises a computer unit 250 for receiving, storing and processing the order data transmitted by the client terminal. It also comprises an ophthalmic lens manufacturing device, comprising, for example, means for molding lenses in accordance with the prescription data and means for trimming lenses in accordance with the shape data.

Contour Reading Appliance

In the client terminal, the optician in this case has a contour reading appliance. This contour reading appliance is a means well-known to those skilled in the art and is not in itself the subject of the invention described. It is, for example, possible to use a contour reading appliance as described in the patent EP 0 750 172 or marketed by Essilor International under the trade name Kappa or under the trade name Kappa CT.

Figure 4:
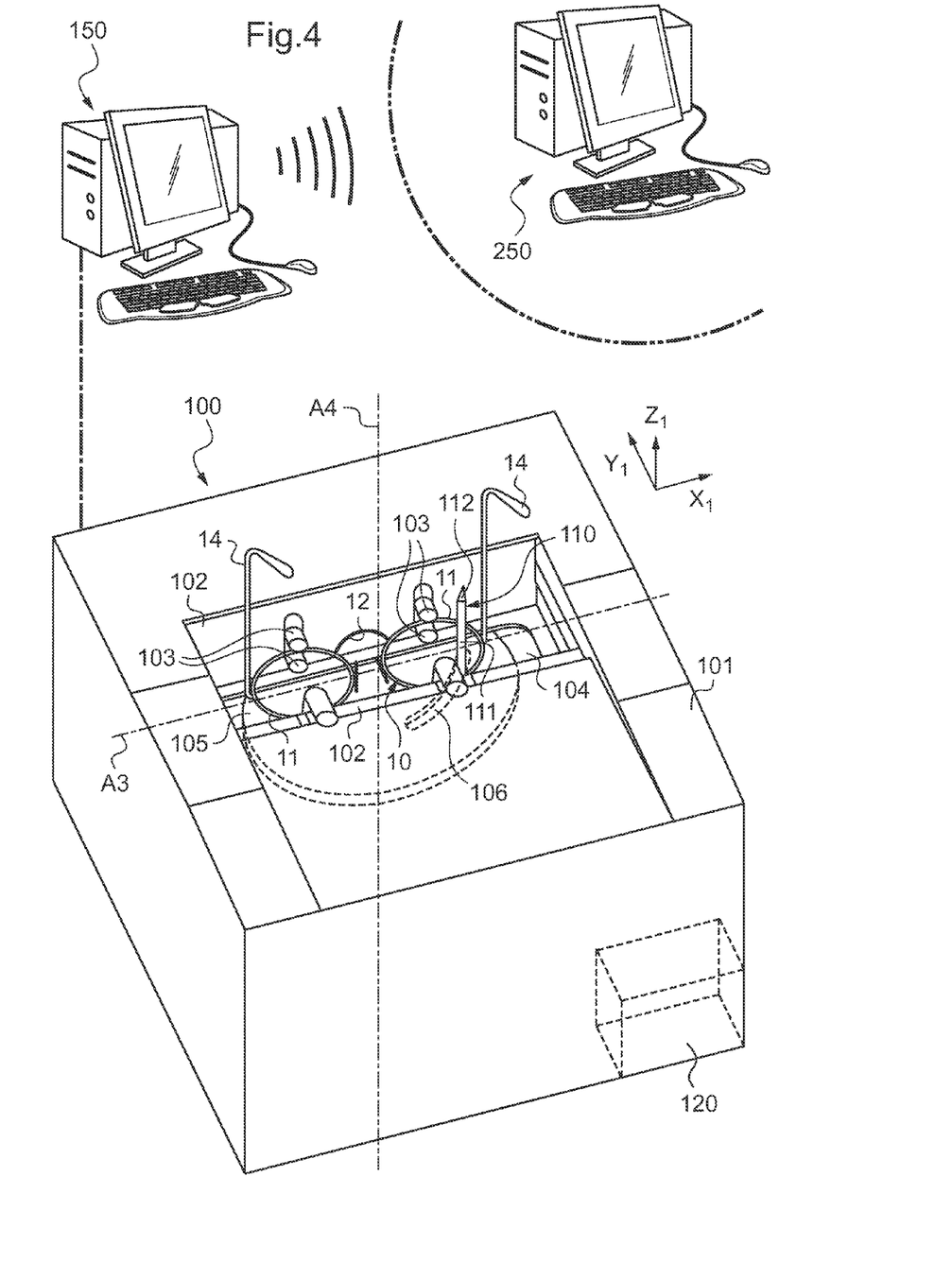
FIG. 4 is a perspective diagrammatic view of a contour reading appliance.

FIG. 4 is an overview of this contour reading appliance 100, as it appears to its user. This appliance comprises a top cover 101 covering all of the appliance apart from a central top portion in which can be arranged a spectacle frame 10 or a presentation lens 27.

The contour reading appliance 100 is intended to record, in the case where the selected spectacle frame is full-rim, the shape of the bottom edge of the groove of each rim 11 of this spectacle frame 10. It is, on the other hand, intended to record, in the case where the selected spectacle frame is half-rim, the shape of the contour of each presentation lens 27.

The contour reading appliance 100 includes, for this purpose, first means for securing a full-rim spectacle frame 10, and second means for securing a presentation lens 27.

The first securing means comprise a set of two jaws 102 that can move relative to one another to form a clamping device. Each of the jaws 102 is provided with two pairs of mobile mountings 103 to form two clamps intended to clamp the spectacle frame 10 in order to immobilize it.

The second securing means, which cannot be seen in the figures, comprise a pin which extends just into the top central portion of the appliance, and the top end of which is arranged to cooperate with one of the faces of the presentation lens 27, in order to immobilize it in this central top portion.

In the space left visible through the opening in the cover 101, a frame 104 can be seen. A deck (not visible) can be moved in translation on this frame 104 along a transfer axis A3. A revolving plate 105 is mounted to revolve on this deck.

This revolving plate 105 is therefore able to assume three positions on the transfer axis A3, namely:
- a first position in which the center of the revolving plate 105 is arranged between the two pairs of mountings 103 securing the right rim of the spectacle frame 10,
- a second position in which the center of the revolving plate 105 is arranged between the two pairs of mountings 103 securing the left rim of the spectacle frame 10, and
- a third intermediate position in which the center of the revolving plate 105 is situated in the axis of the pin securing the presentation lens 27.

The revolving plate 105 has a rotation axis A4 defined as the axis normal to the front face of this revolving plate 105 and passing through its center. It is adapted to pivot about this axis relative to the deck. The revolving plate 105 also comprises an oblong opening 106 in the form of an arc of circle through which projects a feeler 110. This feeler 110 comprises a support stem 111 with an axis perpendicular to the plane of the front face of the revolving plate 105 and, at its free end, a feeling finger 112 of an axis perpendicular to the axis of the support stem 111.

The feeling finger 112 is arranged to follow by sliding or possibly rolling along the bottom edge of the groove of each rim 11 of the spectacle frame 10.

The support stem 111 is arranged to slide along the contour of the presentation lens 27.

The shape reading appliance 100 comprises actuation means (not shown) that are adapted, firstly, to slide the support stem 111 along the opening 106 in order to modify its radial position relative to the rotation axis A4 of the revolving plate 105, secondly, to vary the angular position of the revolving plate 105 about its rotation axis A4, and, thirdly, to position the feeling finger 112 of the feeler 110 at a greater or lesser altitude relative to the plane of the front face of the revolving plate 105.

To sum up, the feeler 110 is provided with three degrees of freedom, namely a first degree of freedom $\rho$ consisting of the capacity of the feeler 110 to be moved radially relative to the rotation axis A4 by virtue of its freedom of movement along the arc of circle formed by the opening 106, a second degree of freedom $\theta$ consisting of the capacity of the feeler 110 to pivot about the rotation axis A4 by virtue of the rotation of the revolving plate 105 relative to the deck, and a third degree of freedom z consisting of the capacity of the feeler 110 to be translated along an axis parallel to the rotation axis A4 of the revolving plate 105.

Each point read by the end of the feeling finger 112 of the feeler 110 is identified in a frame-mounted coordinate system.

This coordinate system is in this case characterized by an orthonormal coordinate comprising a horizontal axis $X_1$ parallel to said transfer axis A3, an ordinate axis $Y_1$ orthogonal to the transfer A3 and rotation A4 axes, and a normal axis $Z_1$.

The contour reading appliance 100 also comprises an electronic and/or computer device 120 used, on the one hand, to drive the actuation means of the shape reading appliance 100, and, on the other hand, to acquire and transmit to the computer unit 150 the coordinates of the end of the feeling finger 112 of the feeler 110.

Trimming Setpoint Generation Method

The method for preparing an ophthalmic lens 30 for it to be mounted in a surround 11, 21 of a spectacle frame 10, 20 comprises two main phases, a first phase for generating a trimming setpoint, and a second phase for trimming the ophthalmic lens according to this trimming setpoint.

The second trimming phase generally proceeds in three successive operations, namely:
- a rough trimming operation which consists in bringing the initially circular contour of the ophthalmic lens to a shape approximating to the desired shape, that is to say, a shape approximating to that of the surround of the selected spectacle frame,
- a finishing operation which consists in forming a fitting rib or a fitting groove on the edge of the ophthalmic lens in order for it to be mounted on a respectively full-rim or half-rim spectacle frame, and,
- a superfinishing operation which consists in polishing the edge of the lens and/or chamfering its sharp edges.

Since the invention relates more specifically to the first phase for generating the trimming setpoint, this second trimming phase that is well-known to those skilled in the art will not be described here in more detail.

The first phase for generating the trimming setpoint breaks down into seven successive operations.

First Operation

The first operation consists in defining the needs of the spectacle wearer.

For this, the wearer goes in turn to an optometrist and to an optician.

The optometrist carries out various examinations relating to the visual acuity of the wearer, so as to determine prescriptions that will be used as a basis for grinding two ophthalmic lenses each adapted to the eyes of the wearer. He determines in particular, the unifocal, bifocal or progressive type of the ophthalmic lenses, and the spherical, cylindrical and prismatic refringence properties of these lenses.

As for the optician, he allows the wearer to select a spectacle frame 10, 20 that is agreeable to him, in this case a full-rim or half-rim spectacle frame. He then carries out the necessary measurements for the centering of the ophthalmic lenses on the selected frame, so that, once assembled on the frame, the lenses are correctly centered facing the eyes of the wearer in order to best fulfill the optical functions for which they are designed.

The optician determines in particular the pupillary points of the wearer within the frame-mounted coordinate system. These pupillary points correspond to the points positioned facing the pupils of the wearer on the lenses fitted in the selected frame. The pupillary points are more particularly identified relative to the contour of each surround 11, 21 of the selected spectacle frame 10, 20, by means of two parameters called pupillary distance and pupillary height. The pupillary distance corresponds to the greatest horizontal distance between the pupillary point and the nasal area of the surround. The pupillary height corresponds to the greatest vertical distance between the pupillary point and the bottom area of the surround.

Second Operation

The second operation consists in acquiring the shapes of the contours of the surrounds 11, 21 of the selected spectacle frame 10, 20.

This acquisition step can be carried out in various ways.

In this case, it is carried out by feeling the rims 11 of the full-rim spectacle frame 10 or the presentation lenses 27 of the half-rim spectacle frame 20.

This acquisition step is in this case conducted on a contour reading appliance 100 as is represented in FIG. 4.

For this, initially, the spectacle frame 10 or the presentation lens 27 is immobilized in the first or second securing means of the contour reading appliance 100.

If it is a full-rim spectacle frame, the latter is secured so that each of its rims 11 is ready to be felt along a path that starts between the two mountings 103 clamping the bottom portion of the corresponding rim 11 of the frame, and which follows the groove of the rim 11 in order to cover the whole circumference of this rim 11.

In the initial position, when the feeling finger 112 is positioned between the two mountings 103, the electronic and/or computer device 120 defines as zero the angular position $\theta_1$ and the altitude $z_1$ of the end of the feeling finger 112 of the feeler 110.

The actuation means then pivot the revolving plate 105 over a complete revolution. During this pivoting, the actuation means impose a constant radial force on the feeler 110 in the direction of the rim 11, so that the feeling finger 112 of the feeler 110 slides along the bottom edge of the groove of the rim 11, without riding up along the front and rear sides of the groove.

Figures 7, 8:
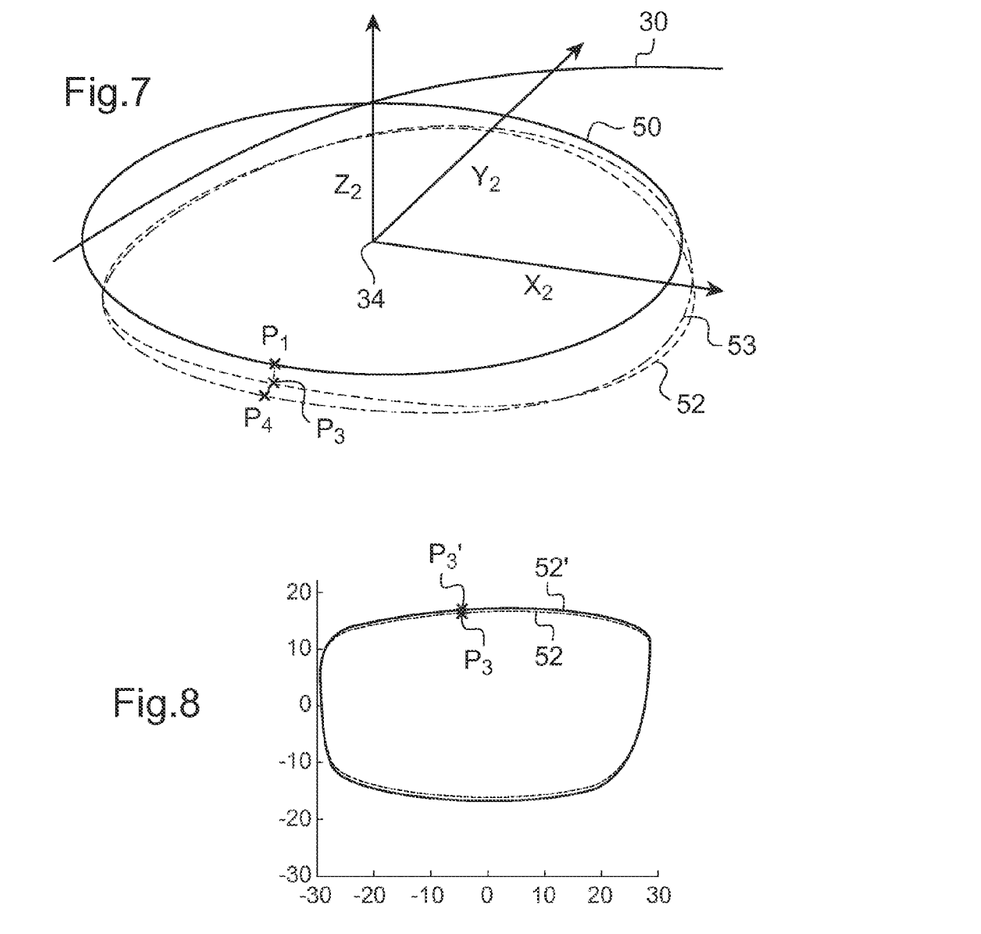
FIG. 7 is a perspective view of the two-dimensional longitudinal profile of FIG. 5, of its projection onto a face of the ophthalmic lens of FIG. 3, and of a distortion of this projection for the purpose of calculating a trimming setpoint for the ophthalmic lens.
FIGS. 8 and 9 are views illustrating two steps for distorting the projected longitudinal profile of FIG. 7.

During the rotation of the revolving plate 105, the electronic and/or computer device 120 records the spatial coordinates $\rho_1, \theta_1, z_1$ of a plurality of points $P_1$ of the bottom edge of the groove (for example 360 points angularly separated by 1 degree), identified in the coordinate system $X_1, Y_1, Z_1$. The 360 felt points $P_1$ thus correspond to the trace of the bottom edge of the groove in 360 transversal sections of the rim 11 angularly separated by 1 degree. As shown in FIG. 7, these 360 felt points $P_1$ thus define a longitudinal profile 50 of the surround 11, substantially the same as the bottom edge of the groove.

If it is a half-rim spectacle frame, one of its presentation lenses 27 is secured at the center of the central top opening of the cover 101, so that its edge can be felt over its entire contour by the support stem 111.

In the initial position, when the support stem 111 is positioned against the edge of the presentation lens 27, the electronic and/or computer device 120 defines as zero the angular position $\theta_1$ of the feeler 110.

The actuation means then pivot the revolving plate 105. During this pivoting, the actuation means impose a constant radial force on the feeler 110 in the direction of the rotation axis A4, so that the support stem 111 of the feeler 110 remains in contact with the edge of the presentation lens 27.

During the rotation of the revolving plate 105, the electronic and/or computer device 120 records the planar coordinates $\rho_1, \theta_1$ of a plurality of points $P_1$ of the edge of the presentation lens 27 (for example 360 points angularly separated by 1 degree). These 360 felt points $P_1$ in this case also define a first longitudinal profile of the surround 21 of the half-rim spectacle frame.

Then, regardless of the full-rim or half-rim type of the selected spectacle frame, the planar $\rho_1, \theta_1$ or spatial $\rho_1, \theta_1, z_1$ coordinates of the 360 felt points $P_1$ are then transmitted by the electronic and/or computer device 120 to the computer unit 150 of the client terminal.

This acquisition step could also be carried out otherwise.

It could, for example, be carried out by feeling one of the rims 11 or one of the presentation lenses 27 of the selected spectacle frame 10, 20 (selected according to the method explained above), then by correcting the shape of the felt longitudinal profile according to a correction parameter.

This correction parameter can be determined according to the architecture of the contour reading appliance 100, and/or the architecture of the appliance intended to machine the ophthalmic lens 30 and/or the shape of the selected spectacle frame 10, 20.

This correction parameter can, for example, be calculated according to:
- the force that the feeler 110 exerts on the rim 11 of the selected spectacle frame 10, to take account of the distortion of the rim while it is being felt;
- the diameter of the point of the feeling finger 112 of the feeler 110, to take account of the fact that the point of the feeling finger 112 is too thick to come into contact with the bottom of the groove of the rim 11 while it is being felt;
- the shape of the section of the groove of the rim 11 and the shape of the section of the grinder intended to form a bevel on the edge of the ophthalmic lens 30, to take account of the fact that, because of the shape differences between the sections of the bevel and of the groove, the bevel does not fit perfectly into the groove of the rim 11 of the selected spectacle frame 10.

This correction parameter can be calculated so as to be constant along the felt longitudinal profile. It can also be calculated so as to vary along this profile, in order, for example, to take account of the variations of the shape of the groove along the rim of the selected spectacle frame.

The step for acquiring the longitudinal profile of the surround could be carried out using a database register. Such a register would comprise, for this purpose, a plurality of records that would each be associated with a style of spectacle frame and would each comprise the coordinates of a plurality of points characterizing the shapes of the surrounds of this style of spectacle frame.

The coordinates of the longitudinal profile of the surround could also be acquired optically, using a laser appliance or an image capture and processing appliance arranged to determine, from a snapshot of the selected spectacle frame, the coordinates of a plurality of points of each of its surrounds.

In this case, at the end of this second operation, the computer unit 150 of the client terminal transmits all of the acquired data to the computer unit 250 of the manufacturer terminal. These data comprise in particular the prescriptions of the wearer and the coordinates of the 360 felt points $P_1$.

These data are then used to grind the two ophthalmic lenses of the wearer and to machine their optical faces to the desired shape, according to methods that are not the subject of the present invention.

They are then used to trim the duly obtained ophthalmic lenses, in order to bring their contours to the desired shape, as will be detailed later in this explanation.

Third Operation

The third operation consists in a calculation of the perimeter length $I_1$ of the surround 11, 21 of the selected spectacle frame 10, 20.

To generate the trimming setpoint, the computer unit 250 must in fact determine this other trimming parameter, so that the ophthalmic lens 30, once trimmed, can present a contour with a perimeter length equal to the perimeter length of the surround 11, 21.

The calculation of the perimeter length $I_1$ of the surround 11, 21 differs depending on whether the selected spectacle frame 10, 20 is full-rim or half-rim.

In the case where the spectacle frame 10 is full-rim, the calculation is performed on the basis of the spatial coordinates $x_{1,i}, y_{1,i}, z_{1,i}$ of the 360 felt points $P_{1,i}$, according to the following formula:

$$I_1 = \sum_{i=0}^{359} \sqrt{(x_{1,i+1} - x_{1,i})^2 + (y_{1,i+1} - y_{1,i})^2 + (z_{1,i+1} - z_{1,i})^2}$$

In the case where the spectacle frame 20 is half-rim, only the planar coordinates $x_1, y_1$ of 360 felt points $P_1$ are known, which does not make it possible to calculate the perimeter length $I_1$ of the surround 21.

Figure 5:
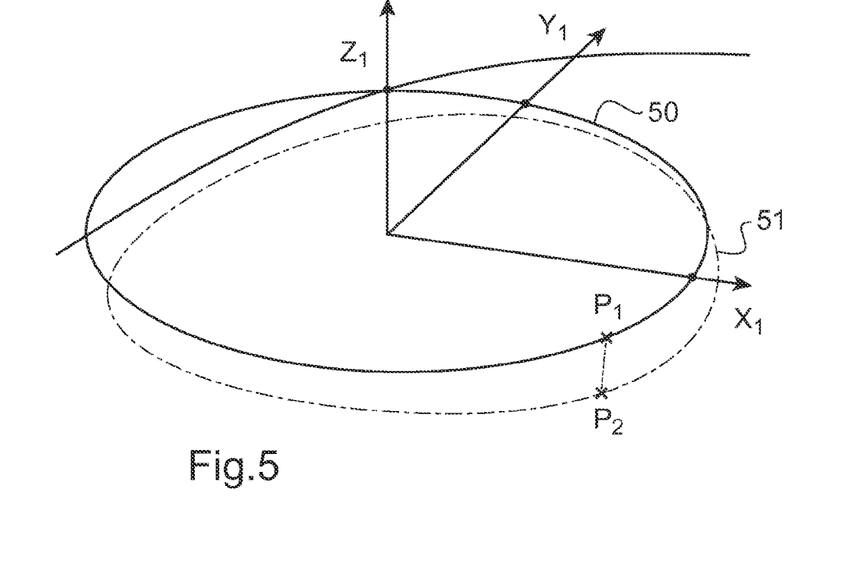
FIG. 5 is a perspective view of a two-dimensional longitudinal profile representative of the shape of one of the surrounds of the spectacle frame of FIG. 2, and of its three-dimensional projection onto a face of a presentation lens of this spectacle frame.

Since the longitudinal profile has been acquired in two dimensions in the plane $(X_1; Y_1)$, the issue then, as shown more particularly in FIG. 5, is to distort this acquired longitudinal profile 50 so as to confer upon it a curvature (on the axis $Z_1$) which corresponds to the curvature of the surround 21.

For this, the computer unit determines the spatial coordinates $x_2, x_2 z_2$ of 360 points $P_2$ of a curved profile 51, deriving from the projection of the 360 points $P_1$ on a predetermined reference surface.

This predetermined reference surface is in this case representative of the shape of the front face of the presentation lens 27. It is in this case spherical. Its radius of curvature $Rc_1$ is equal to a mean radius of curvature, calculated from the radii of curvature of a representative variety of presentation lenses (the radii of curvature of the presentation lenses are in effect generally identical or similar).

The projection is in this case an orthogonal projection on the normal axis $Z_1$. Consequently, the planar coordinates $x_2$, $y_2$ of the 360 projected points $P_2$ of the curved profile 51 are equal to the planar coordinates $x_1, y_1$ of the 360 points of the acquired longitudinal profile 50.

Expressed differently, the projection of the acquired longitudinal profile 50 consists, for the computer unit 250, in a simple calculation of the altitudes $z_2$ of the points $P_2$ of the curved profile 51 according to the radius of curvature $Rc_1$ and the planar coordinates $x_1, y_1$ of the points $P_1$, according to the following formula:

$$z_2 = Rc_1 - \sqrt{Rc_1^2 - \rho_1^2}, \text{ with } \rho_1^2 = (x_1^2 + y_1^2)^{1/2}$$

The spatial coordinates $x_2, y_2, z_2$ of the points $P_2$ of the curved profile 51 are known, so the computer unit 250 then calculates the perimeter length $I_2$ of the curved profile 51, according to the following formula:

$$I_2 = \sum_{i=0}^{359} \sqrt{(x_{2,i+1} - x_{2,i})^2 + (y_{2,i+1} - y_{2,i})^2 + (z_{2,i+1} - z_{2,i})^2}$$

This perimeter length $I_2$ of the curved profile 51 is considered to be equal to the perimeter length $I_1$ of the surround 21.

Fourth Operation

The fourth operation consists in centering, orienting and projecting the longitudinal profile of the surround 11, 21 on the ophthalmic lens 30 so that, once assembled with the spectacle frame, the lens trimmed according to this projected longitudinal profile is appropriately centered facing the pupil of the corresponding eye of the wearer.

Figure 6:
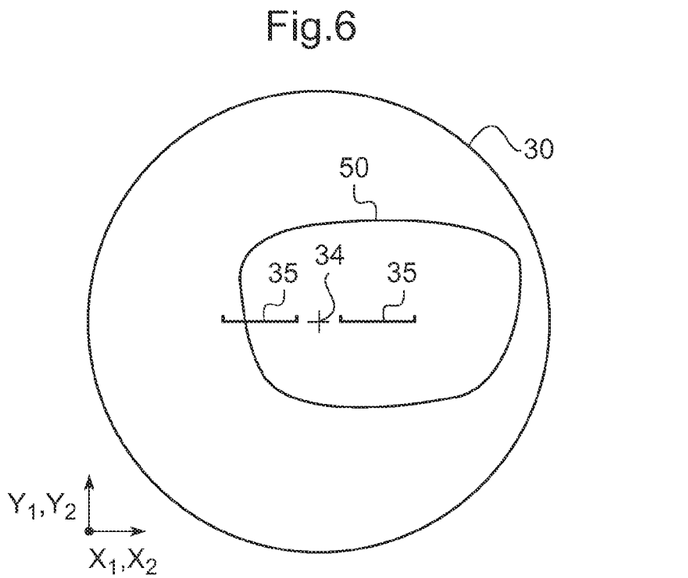
FIG. 6 is a front view of the ophthalmic lens of FIG. 3, on which is superimposed the two-dimensional longitudinal profile of FIG. 5.

In the centering step, as shown by FIG. 6, the aim is to make the mounted coordinate system of the spectacle frame 10, 20 coincide with the optical coordinate system of the ophthalmic lens 30.

This coincidence setting operation is performed by aligning the horizontal axes $X_1$, $X_2$, the Y axes $Y_1$, $Y_2$, and the normal axes $Z_1$, $Z_2$ of the coordinates associated with these two coordinate systems, then by centering the identified pupillary point (and therefore the longitudinal profile) in the coordinate $X_1, Y_1, Z_1$ of the frame on the centering point 34 identified in the coordinate $X_2, Y_2, Z_2$ of the lens.

In the orientation step, the aim is to orient the longitudinal profile of the surround 11, 21 around the centering point 34 according to an angle determined relative to the horizon lines 35 of the ophthalmic lens 30. This angle is determined by the optometrist, and is therefore included in the prescriptions of the wearer. It can be used to check that, once the lens is mounted in the surround, the distribution of its optical powers is appropriate to the corresponding eye of the wearer.

In the projection step, the aim is to rectify the longitudinal profile of the surround 11, 21, which does not have a curvature identical to that of the ophthalmic lens 30, in order to confer upon it such a curvature.

This step is more specifically carried out by projecting the longitudinal profile of the surround 11, 21 onto a surface deduced from a curvature parameter of the ophthalmic lens, so as to be able to deduce the contour along which the ophthalmic lens 30 must be trimmed. In the case in point, this surface corresponds to the front face 31 of the ophthalmic lens 30.

Obviously, as a variant, this projection could be made onto another surface characteristic of the ophthalmic lens 30. It could, for example, be made onto the rear face 32 of the ophthalmic lens 30. It could also be made onto an intermediate surface having a curvature identical to that of one of the front 31 and rear 32 faces of the ophthalmic lens, that is to say onto a surface that is situated between the front 31 and rear 32 faces of the ophthalmic lens 30 and that is parallel to the surface of one of these front 31 and rear 32 faces. It could also be made onto a spherical surface situated between the front 31 and rear 32 faces and having a radius of curvature deduced from the curvatures of the front 31 and rear 32 faces.

In this case, as FIG. 7 shows, the projection is an orthogonal projection along the normal axis $Z_2$. Consequently, the planar coordinates $x_3$, $y_3$ of the 360 points $P_3$ of the projected longitudinal profile 52 are equal to the planar coordinates $x_1$, $y_1$ of the 360 points of the acquired longitudinal profile 50.

To express it differently, the projection of the acquired longitudinal profile 50 consists, for the computer unit 250, of a simple calculation of the altitudes $z_3$ of the points $P_3$ of the projected longitudinal profile 52.

Since the front face of the ophthalmic lens 30 is in this case spherical and has a known radius of curvature $Rc_3$, the altitudes $z_3$ of the points $P_3$ of the projected longitudinal profile 52 are calculated according to the following formula:

$$z_3 = \sqrt{Rc_3^2 - \rho_1^2 - Rc_2}, \; \rho_1 = (x_1^2 + y_1^2)^{1/2}$$

Fifth Operation

Since the spatial coordinates $x_3$, $y_3$, $z_3$ of the points $P_3$ of the projected longitudinal profile 52 are known, the computer unit 250 uses the fifth operation to correct the shape of the projected longitudinal profile 52, so that the corrected longitudinal profile 53 has a perimeter length $I_4$ equal to the perimeter length $I_1$ of the acquired longitudinal profile 50.

This correction is carried out in two steps, in this case successive, consisting in:

i) stretching, according to a given mathematical function $f$, the projected longitudinal profile 52 along the ordinate axis $Y_2$ (FIG. 8), then ii) compressing the stretched longitudinal profile 52' along the horizontal axis $X_2$ until the perimeter lengths $I_1$, $I_4$ of the corrected longitudinal profile 53 and of the acquired longitudinal profile 50 are equal.

In step i), the stretching of the projected longitudinal profile 52 along the ordinate axis $Y_2$ is used to check that the edge of the ophthalmic lens 30 mounted in its surround 11, 21 bears correctly on the bottom and top portions of the surround 11, 21.

The mathematical function $f$ for stretching this projected longitudinal profile 52 is independent of the differences between the perimeter lengths of the different longitudinal profiles.

This mathematical function $f$ is a vector fine mapping about the horizontal axis $X_2$ (also known by the term "expansion") applied to the planar coordinates $x_3$, $y_3$ of the points $P_3$ of the projected longitudinal profile 52. This vector fine mapping has a ratio k, known as the stretching coefficient.

This function can thus be expressed in the form:

$f(y_3) = y_3' = k \cdot y_3$, with $k$ preferably between 1 and 1.05 (see FIG. 8).

This stretching coefficient k can be determined in different ways.

In a first embodiment, provision can be made for the stretching coefficient k to be constant for all the points $P_3$ processed, and for it to be predetermined. It can, for example, be chosen to be equal to 1.03.

In a second embodiment, provision can be made for the stretching coefficient k to be constant for all the points $P_3$ processed, but for it to be determined according to the shape of the ophthalmic lens and/or the shape of the spectacle frame, and/or the material of the spectacle frame.

In order to calculate this stretching coefficient k, the computer unit 250 can, for example, be programmed to, on the one hand, determine the mean radius of curvature $Rc_{50}$ of the surround 11, 21, and, on the other hand, acquire the material of the spectacle frame 10, 20.

Then, if the mean radius of curvature $Rc_{50}$ is greater than or equal to the radius of curvature $Rc_3$ of the ophthalmic lens 30, it assigns the value 1 to the stretching coefficient k, so that the mathematical function $f$ is the identity function.

If the mean radius of curvature $Rc_{50}$ is less than the radius of curvature $Rc_3$ of the ophthalmic lens 30 and if the material of the frame is plastic, it assigns the value 1.03 to the stretching coefficient k.

Finally, if the mean radius of curvature $Rc_{50}$ is less than the radius of curvature $Rc_3$ of the ophthalmic lens and if the material of the frame is metal, it assigns the value 1.035 to the stretching coefficient k.

Thus, the projected longitudinal profile 52 is stretched by approximately 3% along the axis $Y_2$ only if the curve of the ophthalmic lens 30 is greater than that of the surround 11, 21. It is, moreover, more or less stretched, depending on whether or not the spectacle frame is made of an elastically deformable material.

In a third preferred embodiment, provision can be made for the stretching coefficient k to be a variable that is expressed in the form of a function $j(x_3)$, and that therefore depends on the abscissa $x_3$ of the point $P_3$ concerned.

The stretching coefficient k is then determined in order to continually vary according to a so-called semi-circular distribution, in order to be equal to 1 at the points $P_3$ of the projected longitudinal profile 52, the abscissae $x_{3max}$, $x_{3min}$ of which are maximum and minimum, and to be equal to a maximum threshold $S_{max}$ greater than 1 at the points $P_3$ whose abscissae $x_3$ are equal to the mean of the minimum and maximum abscissae.

The stretching coefficient k can, for example, be expressed in the following form:

$$k = j(x_3) = 1 + 4 \cdot S\max \cdot \frac{(x_3 - x_{3min}) \cdot (x_{3max} - x_3)}{(x_{3max} - x_{3min})^2}$$

This maximum threshold $S_{max}$ is preferably predetermined and equal to 1.03. It can also be determined according to the shape of the ophthalmic lens and/or the shape of the spectacle frame, and/or the material of the spectacle frame. It can, for example, be determined according, on the one hand, to the curves of the surround 11, 21 and of the ophthalmic lens 30, and, on the other hand, to the material of the spectacle frame 10, 20, according to a method identical to that explained above.

Whatever the case, at the end of this step i), the computer unit 250 obtains the spatial coordinates $x_3$, $y_3'$, $z_3$ of the points $P_3'$ of the stretched longitudinal profile 52'.

Figure 9:
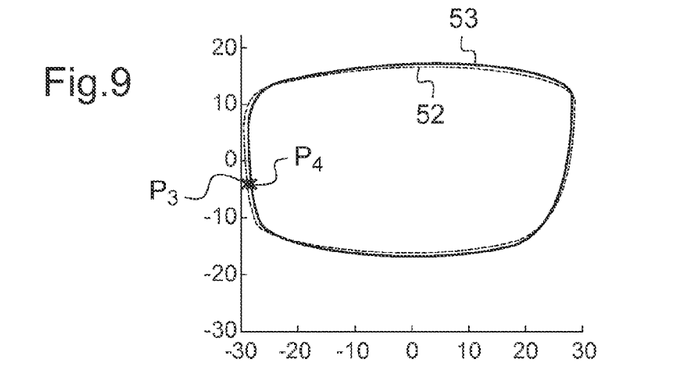

In step ii), it modifies the abscissae $x_3$ of these points $P_3'$ so as to obtain a corrected longitudinal profile 53 of perimeter length $I_4$ equal to the perimeter length $I_1$ of the acquired longitudinal profile 50 (FIG. 9).

During this step, the abscissae $x_3$ of the points $P_3'$ are modified by iteration according to the following formula:

$$x_{3,j+1} = x_{3,j} \cdot \left(1 + \frac{l_1 - l_{3,j}}{l_1}\right),$$

with $I_{3,j}$ being the perimeter length of the longitudinal profile characterized by the coordinate points $x_{3,j}$, $y_3'$, $z_3$.

When this perimeter length $I_{3,j}$ becomes equal, to within 0.1%, to the perimeter length $I_1$ of the acquired longitudinal profile 50, the computer unit stops this iteration and stores the spatial coordinates $x_4$, $y_4$, $z_4$ of the points $P_4$ of the corrected longitudinal profile 53.

As a variant, during this step ii), provision could be made to modify not only the abscissae $x_3$ of these points $P_3'$, but also the ordinates $y_3$ of these points $P_3'$, so that, on the one hand, the corrected longitudinal profile 53 has a perimeter length $I_4$ equal to the perimeter length $I_1$ of the acquired longitudinal profile 50, and, on the other hand, the corrected longitudinal profile 53 remains more elongate than the projected longitudinal profile 52 along the ordinate axis $Y_2$.

Sixth Operation

Figure 10:
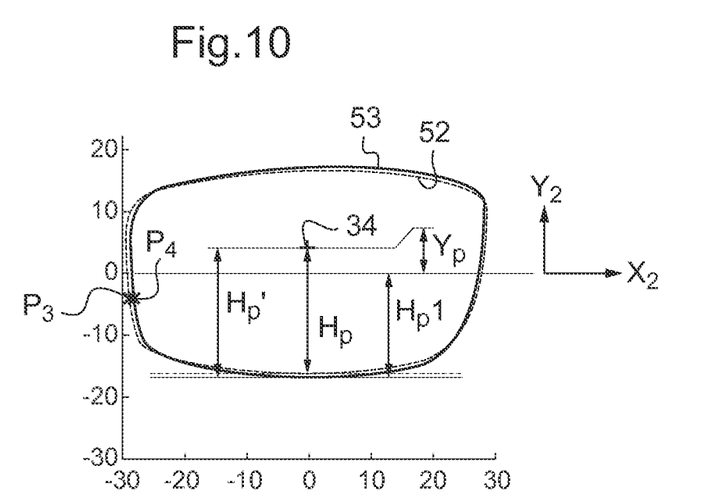
FIGS. 10 and 11 are front views of the longitudinal profile projected onto the lens and of the distorted longitudinal profile of FIG. 7, in which the centering point is respectively situated above and below the zero ordinate line in the optical coordinate system of the lens.
Figure 11:
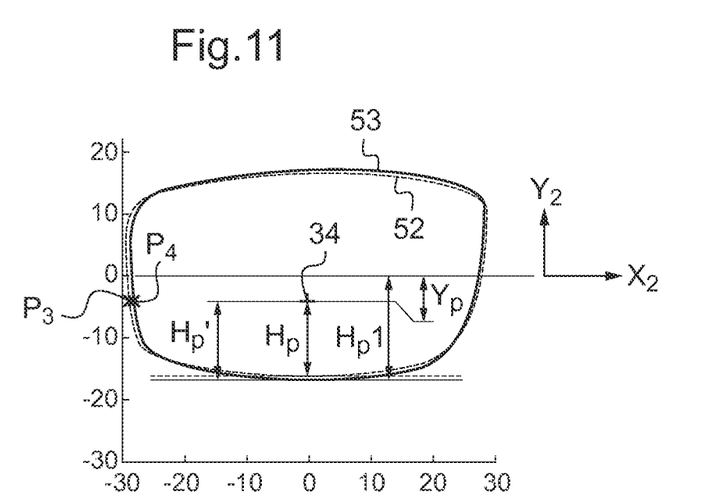

As FIGS. 10 and 11 show, the correction made to the projected longitudinal profile 52 generates a difference in height (along the ordinate axis $Y_2$) between, on the one hand, the segment that links the centering point 34 and the lowest point of the projected longitudinal profile 52, and, on the other hand, the segment that links the centering point 34 and the lowest point of the corrected longitudinal profile 53.

This height difference generates an offset between the pupillary height Hp transmitted by the optician to the manufacturer terminal (which was used to center the projected longitudinal profile 52 on the ophthalmic lens 30) and the pupillary height Hp' that can be measured on the ophthalmic lens trimmed according to the corrected longitudinal profile 53.

Consequently, when the optician receives the trimmed ophthalmic lens 30 and he checks that it has been correctly centered, he will observe an offset $d_{Hp}$ between the measured pupillary height Hp' and the pupillary height Hp initially transmitted to the manufacturer terminal.

The sixth operation then consists in determining this offset $d_{Hp}$ so as to be able to transmit it to the optician so that the latter does not consider this offset to be an error.

For this, two cases must be considered.

Consider first of all the case where the pupillary point is situated at a point of positive abscissa $x_p$ and ordinate $y_p$ (FIG. 10). This pupillary point is then situated above the horizontal axis $X_2$ (ordinate y=0). In this case, the offset $d_{Hp}$ is expressed in the form of:

$$d_{Hp} = Hp1 \cdot (k(x_p) - 1), \text{ with } Hp1 \text{ corresponding to half the maximum height of the projected longitudinal profile } \mathbf{52} \text{ along the ordinate axis } Y_2.$$

Now consider the case where the pupillary point is situated at a point of negative abscissa $x_p$ and ordinate $y_p$ (FIG. 11). This pupillary point is then situated below the horizontal axis $X_2$. In this case, the offset $d_{Hp}$ is expressed in the form:

$$d_{Hp} = (Hp1 + y_p) \cdot (k(x_p) - 1), \text{ with } y_p < 0.$$

The new pupillary height Hp' that the optician will then measure on the ophthalmic lens 30 is then expressed thus:

$$Hp' = Hp + d_{Hp}.$$

Seventh Operation

The seventh operation consists in determining a rough and finishing setpoint for the trimming of the ophthalmic lens 30, so as to trim it according to this corrected longitudinal profile 53. It also consists in determining a superfinishing setpoint for the trimming of the ophthalmic lens, so as to polish it and/or chamfer it.

This seventh operation varies according to the architecture of the trimming device used. It will not therefore be explained here in detail.

The present invention is in no way limited to the embodiments described and represented, but those skilled in the art will be able to add any variant thereto that comes to mind.

In particular, the third, fourth and sixth operations can be carried out, not by the computer unit 250 of the manufacturer terminal but by any other computer unit programmed accordingly, for example by the computer unit of the client terminal.

In another embodiment of the invention, provision can be made for the steps for projecting the longitudinal profile of the surround 11, 21 onto a curved surface and for correcting the projected longitudinal profile 52 to be carried out not after the step for centering the ophthalmic lens 30, but before this centering step.

Consequently, when these projection and correction steps are implemented, the geometry of the ophthalmic lens 30 is not yet known. During the projection step, it is then only possible to project the acquired longitudinal profile 50 onto a surface approximating the shape of one of the faces 31, 32 of the ophthalmic lens 30. This approximate surface is then calculated according to a parameter characteristic of the curvature not of the ophthalmic lens, but rather of the spectacle frame.

For this, in the case of a full-rim spectacle frame 10, after the electronic and/or computer device 120 of the contour reading appliance 100 has acquired the spatial coordinates $\rho_1$, $\theta_1$, $z_1$ of the 360 felt points $P_1$, it acquires the spatial coordinates of at least three points situated on the front face of the rim 11. It deduces therefrom by calculation the abovementioned curvature parameter, which in this case corresponds to the radius of curvature of the sphere, the standard deviation of which at all the felt points on the front face of the rim 11 is minimum.

The 360 felt points $P_1$ are then projected onto this sphere, which is considered as an approximation of the shape of the front face of the ophthalmic lens.

In practice, when it is machined, an ophthalmic lens 30 is generally beveled so that, once fitted in its rim 11, its front face 31 is esthetically flush with the front face of the rim 11. Consequently, by acquiring the shape of the front face of the rim of the spectacle frame, it is possible to determine the curvature of a surface approximating the shape of the front face 31 of the ophthalmic lens 30.

The projection step thus makes it possible to obtain a projected longitudinal profile, the curvature of which substantially corresponds to the curvature of the front face of the ophthalmic lens 30.

In this embodiment, the correction and centering steps are then carried out on the basis of this projected longitudinal profile, according to a method identical to that explained previously.

The invention claimed is:

1. A method for generating a trimming setpoint for trimming an ophthalmic lens (30) that is to be fitted in a surround (11, 21) of a spectacle frame (10, 20), comprising steps consisting in:
   a) within a coordinate system of the surround (11, 21) identified by a horizontal axis ($X_1$), acquiring the shape of a longitudinal profile (50) of said surround (11, 21) and the perimeter length ($I_1$) of this acquired longitudinal profile (50);
   b) within an optical coordinate system of the ophthalmic lens (30) which is identified by a centering point (34) and by a horizontal axis ($X_2$) and which is made to coincide with the coordinate system of the surround, centering and orienting said acquired longitudinal profile (50),
   c) projecting said acquired longitudinal profile (50) onto a curved surface deduced from a curvature parameter of said ophthalmic lens (30) or from a curvature parameter of said spectacle frame (10, 20), d) correcting the shape of said projected longitudinal profile (52), so as to equalize its perimeter length ($I_3$) with the perimeter length ($I_1$) of the acquired longitudinal profile (50), e) deducing from said corrected longitudinal profile (53) said trimming setpoint, wherein, in step d), the correction is made in two operations consisting in:

stretching, according to a given mathematical function (f), the projected longitudinal profile (52) along an ordinate axis ($Y_1, Y_2$) transversal to said horizontal axis ($X_1, X_2$), and in compressing the stretched longitudinal profile (52') along an axis ($X_1, X_2$) orthogonal to said ordinate axis ($Y_1, Y_2$).

2. The method as claimed in claim 1, wherein, said optical coordinate system also being identified by a normal axis ($Z_2$) perpendicular to the tangential plane of the ophthalmic lens (30) at the centering point (34), said ordinate axis ($Y_2$) is orthogonal to said horizontal ($X_2$) and normal ($Z_2$) axes.

3. The method as claimed in claim 1, wherein steps a) to e) are successively performed one after the other and wherein said curved surface is deduced from the curvature parameter of said ophthalmic lens (30).

4. The method as claimed in claim 1, wherein steps c) and d) are performed before step b) and wherein said curved surface is deduced from the curvature parameter of the surround of said spectacle frame (10, 20).

5. The method as claimed in claim 1, wherein, in step d), the two correction operations are performed successively and wherein, during the compression operation, the stretched longitudinal profile (52') is also compressed along the ordinate axis ($Y_1, Y_2$) so that the corrected longitudinal profile (53) remains more elongated than the projected longitudinal profile (52) along the ordinate axis ($Y_1, Y_2$).

6. The method as claimed in claim 1, wherein said mathematical function (f) is independent of the difference between said perimeter lengths ($I_1, I_3$).

7. The method as claimed in claim 1, wherein the mathematical function (f) is an expansion about the horizontal axis ($X_2$), of a ratio (k) known as the stretching coefficient.

8. The method as claimed in claim 1, wherein the mathematical function (f) has a predetermined stretching coefficient (k).

9. The method as claimed in claim 1, wherein the mathematical function (f) has a stretching coefficient (k) that is determined according to the shape of the ophthalmic lens (30) or the shape of the spectacle frame (10, 20) or the material of the spectacle frame (10, 20).

10. The method as claimed in claim 1, wherein the mathematical function (f) has a stretching coefficient (k) that is variable according to the position of the point concerned on the projected longitudinal profile (52).

11. The method as claimed in claim 9, wherein the stretching coefficient (k) is determined according to a curve characteristic of the surround (11, 21).

12. The method as claimed in claim 11, wherein, if said curve characteristic is below a determined threshold, the stretching coefficient (k) is equal to 1 at any point of the projected longitudinal profile (52) and said mathematical function (f) is the identity function, otherwise, the stretching coefficient (k) is strictly greater than 1 in at least a portion of the projected longitudinal profile (52).

13. The method as claimed in claim 1, wherein said curved surface is the front (31) or rear (32) face of the ophthalmic lens (30) or is situated between the front (31) and rear (32) faces of the ophthalmic lens (30).

14. The method as claimed in claim 1, wherein said projection is an orthogonal projection along an axis ($Z_2$) that is normal to the horizontal axis ($X_2$).

15. The method as claimed in claim 1, wherein, in step a), the spatial coordinates ($x_1, y_1, z_1$) of a plurality of points ($P_1$) characterizing the shape of said acquired longitudinal profile (50) are acquired, and the perimeter length ($I_1$) of said acquired longitudinal profile (50) is calculated on the basis of these spatial coordinates ($x_1, y_1, z_1$).

16. The method as claimed in claim 10 wherein the stretching coefficient (k) is determined according to a curve characteristic of the surround (11, 21).

17. The method as claimed in claim 16, wherein, if said curve characteristic is below a determined threshold, the stretching coefficient (k) is equal to 1 at any point of the projected longitudinal profile (52) and said mathematical function (f) is the identity function, otherwise, the stretching coefficient (k) is strictly greater than 1 in at least a portion of the projected longitudinal profile (52).

* * * * *